(No Model.)

F. & R. KABUS.
OPTOMETER.

No. 271,472. Patented Jan. 30, 1883.

2 Sheets—Sheet 1.

WITNESSES:
Carl Karp
Otto Risch

INVENTORS
Friedrich Kabus
and Robert Kabus
BY Paul Goepel
ATTORNEY (No Model.) 2 Sheets—Sheet 2.
F. & R. KABUS.
OPTOMETER.
No. 271,472. Patented Jan. 30, 1883.
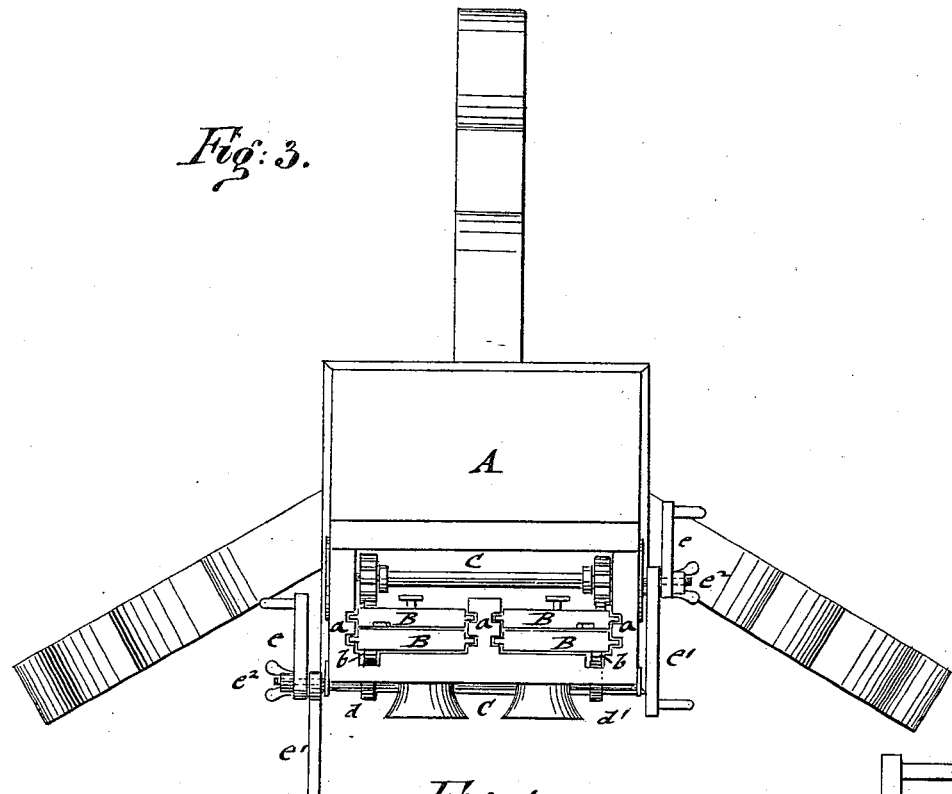
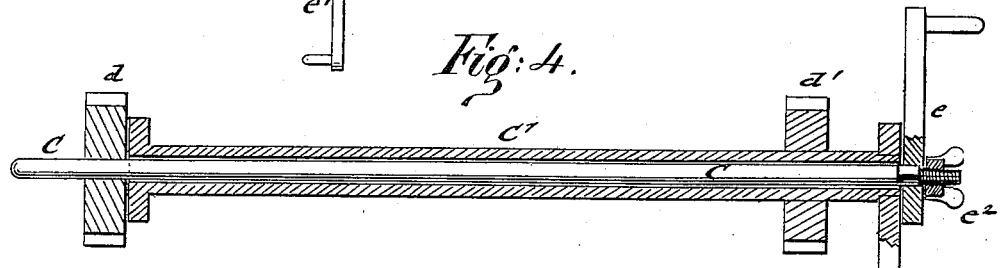
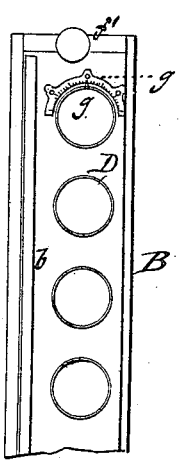
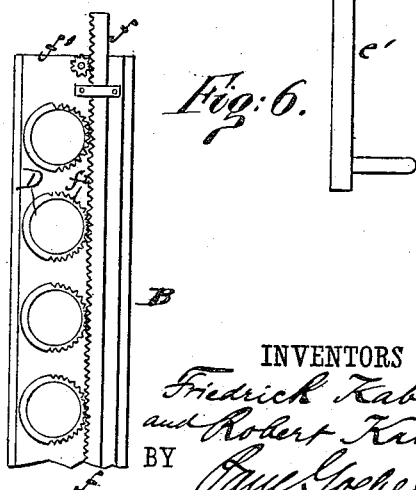
WITNESSES:
Carl Kay
Otto Risch
INVENTORS
Friedrich Kabus
and Robert Kabus
BY Paul Goepel
ATTORNEY

UNITED STATES PATENT OFFICE.

FRIEDRICH KABUS AND ROBERT KABUS, OF NEW YORK, N. Y.

OPTOMETER.

SPECIFICATION forming part of Letters Patent No. 271,472, dated January 30, 1883.

Application filed April 10, 1882. (No model.)

*To all whom it may concern:*

Be it known that we, FRIEDRICH KABUS and ROBERT KABUS, of the city, county, and State of New York, have invented certain new and useful Improvements in Optometers, of which the following is a specification.

This invention relates to an improved apparatus or instrument whereby the number and kind of lenses required by persons using spectacles may be quickly and accurately determined, the apparatus being specially designed for the use of opticians, so as to assist them in selecting, with the least possible loss of time, the proper lenses for short-sighted customers.

The invention consists of an upright case provided with two or more slide-frames having each a number of lenses, and of means whereby either one or two slide-frames may be raised or lowered separately or jointly, so that any one lens or two lenses may be brought into the line of vision of the person trying to select the lenses. The upper part of the upright casing is closed by a hinged door, which, when thrown down, is used as a slide-rest for the object-holder. Some of the slide-frames are provided with a sliding rack-bar that meshes with toothed segments at the circumferences of the lens-frames, so that by raising or lowering the rack-bar the lenses may be turned in one or the opposite direction around their axis, the angle of deviation being indicated by a pointer of one lens-frame on a fixed graduated scale of the slide-frame.

Figure 1:
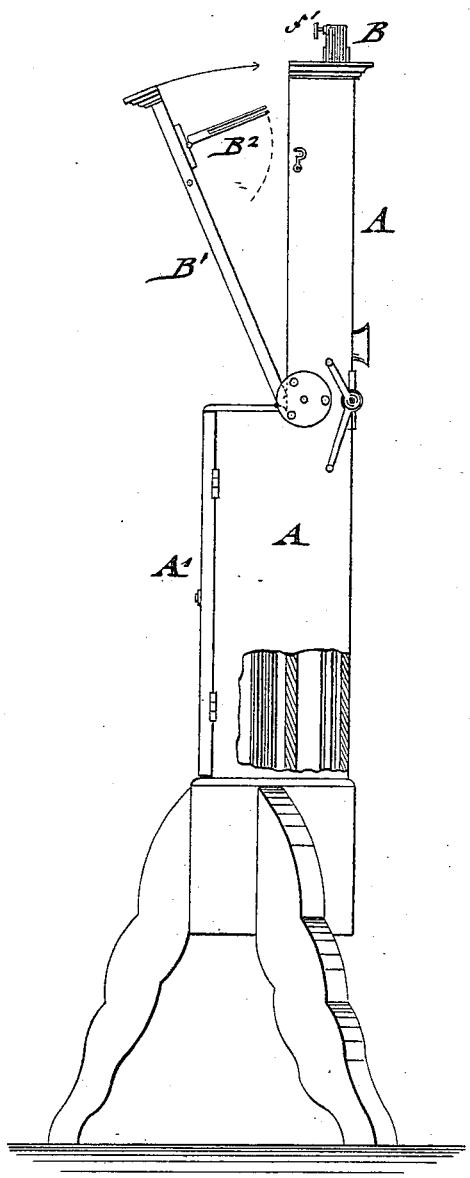
Figure 2:
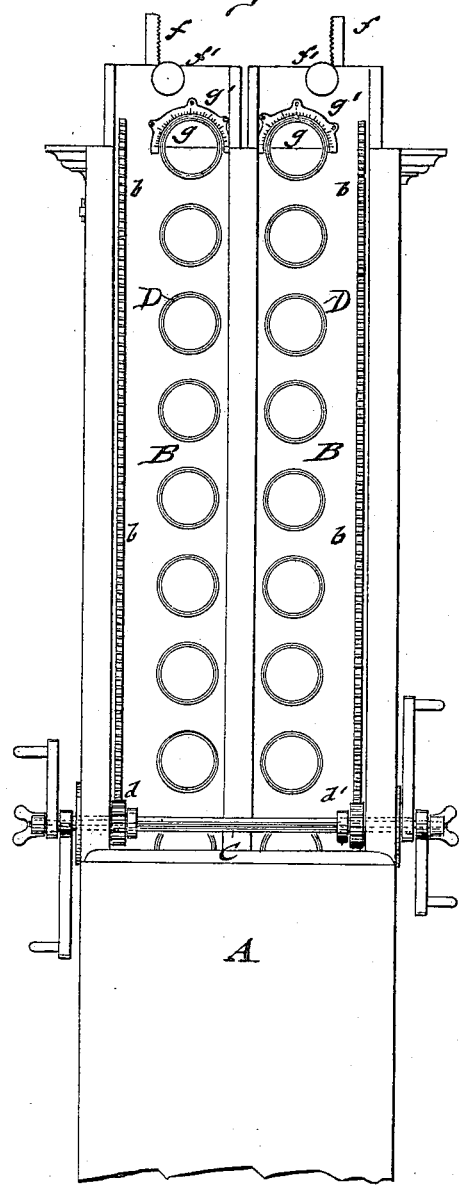

In the accompanying drawings, Figure 1 is a side elevation, with a part broken away, of our improved optometer. Fig. 2 is a front elevation of the upper part of the instrument, drawn on a larger scale. Fig. 3 is a plan view of the same; Fig. 4, a detail vertical central section of the crank-shafts for operating the slide-frames, and Figs. 5 and 6 are respectively a detail front elevation and an interior view of a slide-frame having axially-movable lenses.

Similar letters of reference indicate the corresponding parts.

Referring to the drawings, A represents an upright case, which is supported on legs of suitable height, and made wider at the lower part, so as to form a top shoulder or rest for the hinged door A' of the upper part and a storage-space for some of the lens-containing slide-frames B. The door B' of the upper part of the casing A is hinged at its lower edge to the casing, so as to be adapted to be let down into a horizontal position on the shoulder of the lower part of the casing, in which position it serves as a slide-rest for the folding adjustable object-holder B². Somewhat above the shoulder formed by the lower wider part of the casing A are arranged in the upper part of the casing two fixed eye-tubes, through which the person whose power of vision is to be tested looks toward the object placed on the object-holder B². In the vertical space which extends through the entire length of the upper and lower parts of the casing A are arranged beside of each other one or more pairs of slide-frames, B, which are guided by side and intermediate rails, $a\ a$, and raised or lowered separately or jointly by means of rack-bars $b\ b$, that are attached to and extended throughout the full length of the slide-frames B and intersecting pinions $d\ d'$ of a transverse crank-shaft, C C'. This crank-shaft consists of an interior shaft, C, and an exterior tubular shaft, C', each of which is provided with a crank at its end, the crank $e$ of the interior shaft being adapted to be tightly clamped to the shaft of the outer tubular shaft, C', by a thumb-screw, $e^2$, so that both can be turned at the same time. By loosening the clamp-nut $e^2$ each crank-shaft may be separately turned, and consequently each slide-frame be raised or lowered independently of the other. By clamping the cranks together both shafts are turned, and consequently a pair of adjoining slide-frames jointly raised or lowered. The independent movement of each slide-frame is of advantage, as any lens may be brought at will before the vision of the eye to be tested, especially if the eyes are of different power.

The slide-frames B are provided with a number of lenses, D, one pair containing the lenses commonly used, (spherical,) the other pair prismatic or cylindrical lenses, so that by the combination of both pairs of slide-frames a combination of the spherical and prismatic or cylindrical lenses may be brought into the line of vision of the eyes.

The person whose eyes are to be tested is seated back of the apparatus, with his eyes placed in position on the eye-tubes so as to look through them toward the object-holder. The slide-frames are then slowly raised or lowered until the proper number of lens for both eyes is obtained. Besides the vertical adjustment of the slide-frames B, one pair of slide-frames, especially such containing cylindrical or prismatic lenses, are furthermore arranged with means by which all the lenses may be turned around their axis in order to suit a distorted vision. This axial adjustment of the lenses is obtained by means of a sliding rack, $f$, which is guided in a groove of the slide-frame B, said rack being raised or lowered by means of a pinion, $f'$, actuated by a milled head. The sliding rack $f$ engages toothed segments $f^2$ of the encircling frames of each lens, so that all the lenses are turned at the same time, either to the right or left, through an angle of ninety degrees, the angle to which they are turned being indicated by means of an index or pointer, $g$, applied to the uppermost lens-frame on a stationary graduating-scale, $g'$, at the upper end of the slide-frame B, as shown clearly in Figs. 2 and 5. By this arrangement the exact lens required for each and every eye may be readily determined by the instruments, and consequently the customers suited in a quicker and more satisfactory manner.

Having thus described our invention, we claim as new and desire to secure by Letters Patent—

1. An optometer or apparatus for testing the eyesight, consisting of an upright case, vertically-guided lens-carrying slide-frames, and means for adjusting the lens-frames separately or jointly, so as to bring any lens into the line of vision, substantially as and for the purpose set forth.

2. The combination of an upright guide-case, vertically-guided lens-carrying slide-frames having rack-bars attached to said slide-frames, and transverse crank-shafts having pinions meshing with the racks, and means whereby the shafts may be clamped together or disconnected, so as to be jointly or separately turned for raising or lowering the slide-frames, substantially as set forth.

3. The combination of an upright case, having eye-tubes at one side and a hinged door provided with a sliding and folding object-holder at the other side, with vertically-guided lens-carrying slide-frames and means for adjusting the same higher or lower, substantially as set forth.

4. In an optometer, a lens-carrying slide-frame having lenses set in metallic lens-frames with toothed segments, in combination with a sliding rack that engages the segments of the lens-frames, and means for raising or lowering the sliding rack, substantially as specified.

In testimony that we claim the foregoing as our invention we have signed our names in presence of two subscribing witnesses.

FRIEDRICH KABUS.
ROBERT KABUS.

Witnesses:
PAUL GOEPEL,
CARL KARP.